United States Patent
Enomoto

(10) Patent No.: US 7,538,953 B2
(45) Date of Patent: May 26, 2009

(54) ZOOM LENS SYSTEM

(75) Inventor: Takashi Enomoto, Chiba (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/127,113

(22) Filed: May 27, 2008

(65) Prior Publication Data

US 2008/0297914 A1 Dec. 4, 2008

(30) Foreign Application Priority Data

May 30, 2007 (JP) ............................. 2007-142992

(51) Int. Cl.
*G02B 15/14* (2006.01)
(52) U.S. Cl. ....................... 359/682; 359/689
(58) Field of Classification Search ......... 359/680–682, 359/689
See application file for complete search history.

(56) References Cited

U.S. PATENT DOCUMENTS

| | | | |
|---|---|---|---|
| 6,498,687 | B1 | 12/2002 | Sekita et al. |
| 6,498,688 | B2 * | 12/2002 | Shibayama .................. 359/689 |
| 6,515,804 | B2 | 2/2003 | Watanabe et al. |
| 6,597,513 | B2 | 7/2003 | Minefuji |
| 6,833,964 | B2 | 12/2004 | Mizuguchi et al. |
| 7,206,138 | B2 | 4/2007 | Katakura et al. |
| 2004/0223230 | A1 | 11/2004 | Saori |
| 2005/0046961 | A1 | 3/2005 | Saori |
| 2005/0057819 | A1 | 3/2005 | Eguchi |
| 2007/0047097 | A1 | 3/2007 | Nakamura et al. |
| 2007/0188888 | A1 | 8/2007 | Saori |
| 2007/0263295 | A1 | 11/2007 | Enomoto |

FOREIGN PATENT DOCUMENTS

| | | |
|---|---|---|
| JP | 2001-318311 | 11/2001 |
| JP | 2003-15035 | 1/2003 |
| JP | 2005-70696 | 3/2005 |
| JP | 2005-70697 | 3/2005 |
| JP | 3652179 | 3/2005 |
| JP | 3709148 | 8/2005 |
| JP | 2006-126418 | 5/2006 |

OTHER PUBLICATIONS

English language Abstract of JP 2006-126418, May 18, 2006.
U.S. Appl. No. 12/127,914 to Saori, which was filed on May 28, 2008.

* cited by examiner

*Primary Examiner*—Scott J Sugarman
(74) *Attorney, Agent, or Firm*—Greenblum & Bernstein, P.L.C.

(57) ABSTRACT

A zoom lens system having a negative first lens group, a positive second lens group, and a positive third lens group, where each of the first to third lens groups is moved along the optical axis to perform zooming and the first lens group includes a negative lens element, a negative lens element and a positive lens element, the second lens group includes a positive lens element, a positive lens element and a negative lens element, the combined refractive power of the image-side positive lens element and the negative lens element is negative, and these lens elements are cemented to each other. The third lens group includes a positive lens element and a negative lens element which are cemented to each other, in this order from the object.

7 Claims, 7 Drawing Sheets

Fig. 1
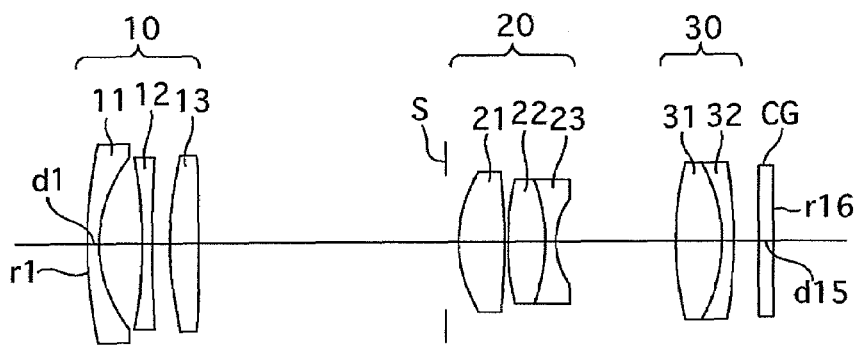
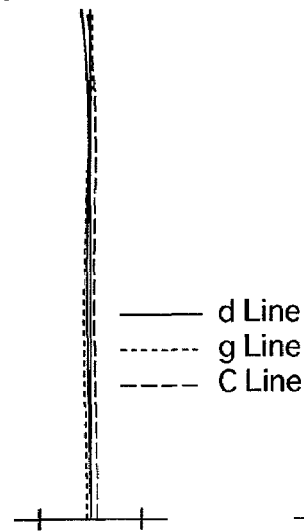
Fig. 2A
FNO= 1: 2.0
— d Line
······ g Line
---- C Line
-0.2  0.2
SPHERICAL ABERRATION
CHROMATIC ABERRATION
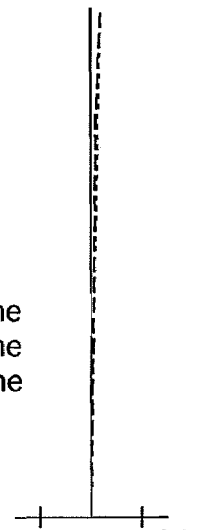
Fig. 2B
W=31.3°
-0.02  0.02
LATERAL CHROMATIC ABERRATION
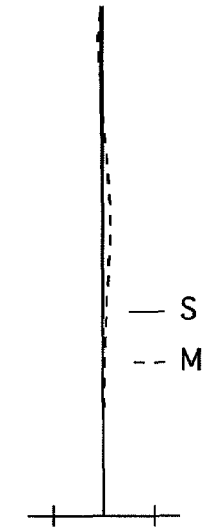
Fig. 2C
W=31.3°
— S
-- M
-0.2  0.2
ASTIGMATISM
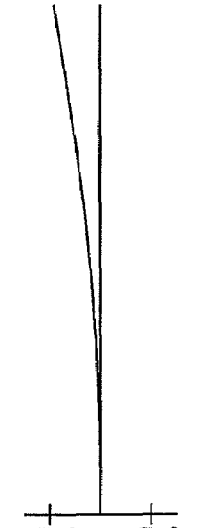
Fig. 2D
W=31.3°
-5.0(%)5.0
DISTORTION

FNO=1:3.0

— d Line
------ g Line
---- C Line

-0.2   0.2
SPHERICAL
ABERRATION

CHROMATIC
ABERRATION

W=19.1°

-0.02  0.02
LATERAL
CHROMATIC
ABERRATION

W=19.1°

— S
-- M

-0.2   0.2
ASTIGMATISM

W=19.1°

-5.0(%)5.0
DISTORTION

FNO=1:4.2

— d Line
------ g Line
---- C Line

-0.2   0.2
SPHERICAL
ABERRATION

CHROMATIC
ABERRATION

W=11.6°

-0.02  0.02
LATERAL
CHROMATIC
ABERRATION

W=11.6°

— S
-- M

-0.2   0.2
ASTIGMATISM

W=11.6°

-5.0(%)5.0
DISTORTION

Fig. 5
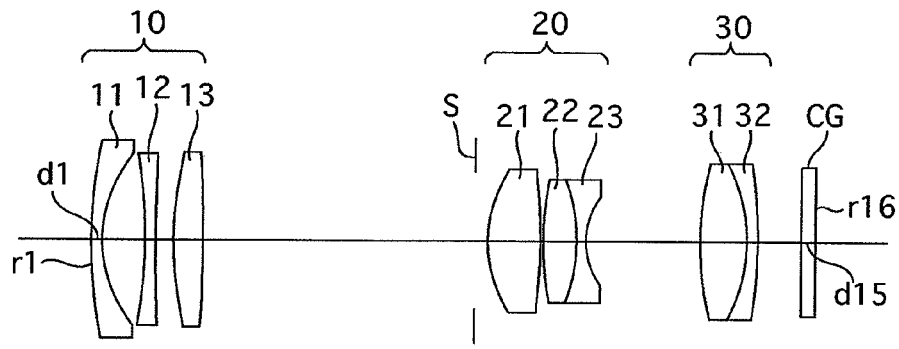
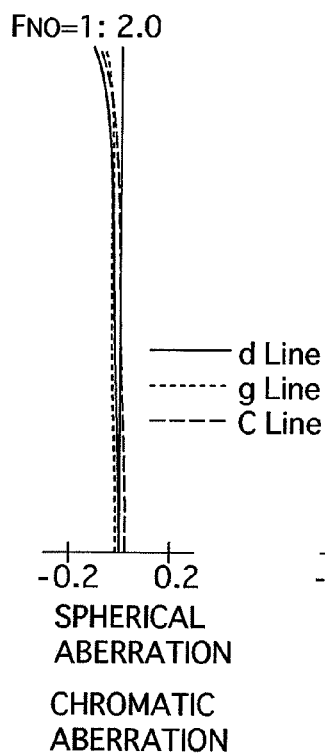
Fig. 6A
FNO=1: 2.0
——— d Line
------- g Line
----- C Line
-0.2  0.2
SPHERICAL
ABERRATION
CHROMATIC
ABERRATION
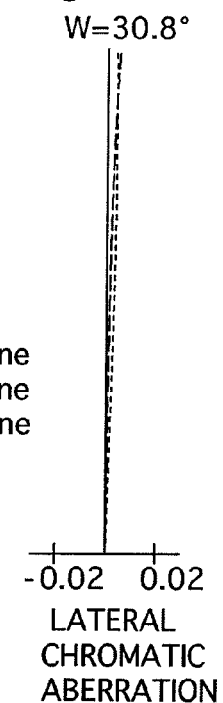
Fig. 6B
W=30.8°
-0.02  0.02
LATERAL
CHROMATIC
ABERRATION
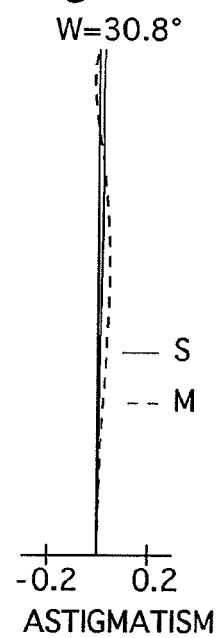
Fig. 6C
W=30.8°
——— S
--- M
-0.2  0.2
ASTIGMATISM
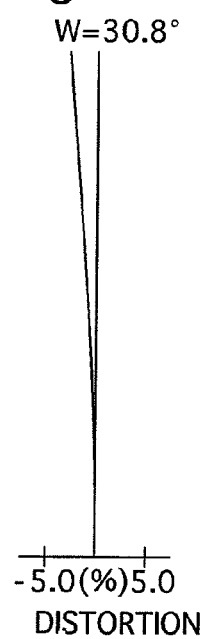
Fig. 6D
W=30.8°
-5.0(%)5.0
DISTORTION

FNO= 1: 3.0

- d Line
- ....... g Line
- ---- C Line

-0.2  0.2
SPHERICAL
ABERRATION
CHROMATIC
ABERRATION

W=19.1°

-0.02  0.02
LATERAL
CHROMATIC
ABERRATION

W=19.1°

— S
-- M

-0.2  0.2
ASTIGMATISM

W=19.1°

-5.0(%)5.0
DISTORTION

FNO= 1: 4.3

- d Line
- ....... g Line
- ---- C Line

-0.2  0.2
SPHERICAL
ABERRATION
CHROMATIC
ABERRATION

W=11.6°

-0.02  0.02
LATERAL
CHROMATIC
ABERRATION

W=11.6°

— S
-- M

-0.2  0.2
ASTIGMATISM

W=11.6°

-5.0(%)5.0
DISTORTION

Fig. 9
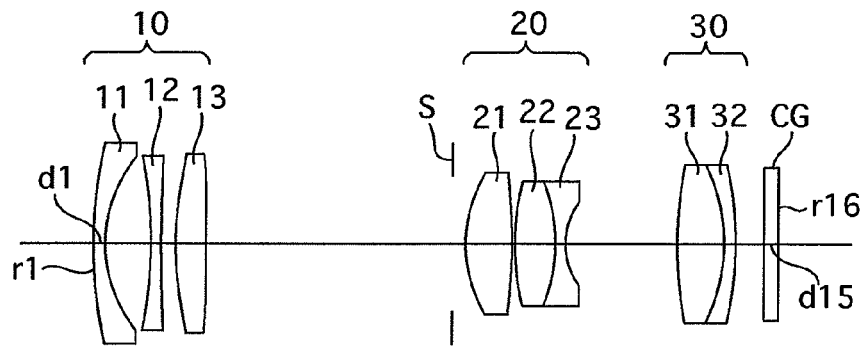
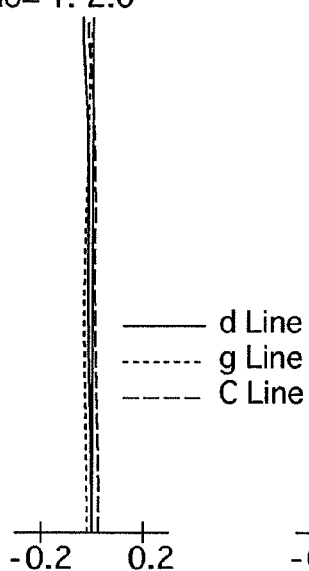
Fig. 10A
FNO= 1: 2.0
—— d Line
------ g Line
---- C Line
-0.2  0.2
SPHERICAL
ABERRATION
CHROMATIC
ABERRATION
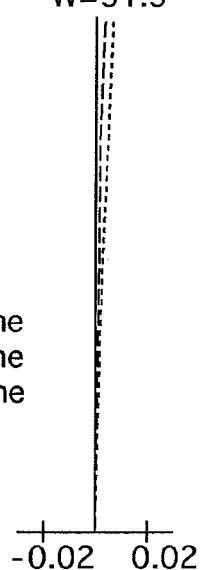
Fig. 10B
W=31.3°
-0.02  0.02
LATERAL
CHROMATIC
ABERRATION
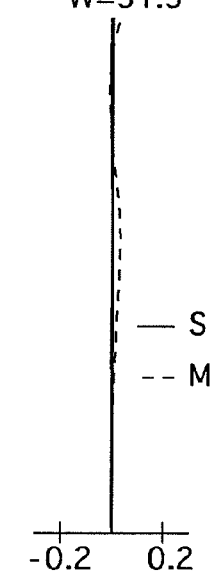
Fig. 10C
W=31.3°
—— S
-- M
-0.2  0.2
ASTIGMATISM
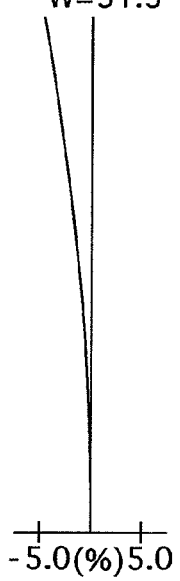
Fig. 10D
W=31.3°
-5.0(%)5.0
DISTORTION

FNO=1:3.0

—— d Line
------ g Line
---- C Line

-0.2  0.2
SPHERICAL
ABERRATION
CHROMATIC
ABERRATION

W=19.1°

-0.02  0.02
LATERAL
CHROMATIC
ABERRATION

W=19.1°

—— S
-- M

-0.2  0.2
ASTIGMATISM

W=19.1°

-5.0(%)5.0
DISTORTION

FNO=1:4.2

—— d Line
------ g Line
---- C Line

-0.2  0.2
SPHERICAL
ABERRATION
CHROMATIC
ABERRATION

W=11.6°

-0.02  0.02
LATERAL
CHROMATIC
ABERRATION

W=11.6°

—— S
-- M

-0.2  0.2
ASTIGMATISM

W=11.6°

-5.0(%)5.0
DISTORTION

ZOOM LENS SYSTEM

BACKGROUND OF THE INVENTION

1. Field of the Invention

The present invention relates to a zoom lens system for use as an imaging lens system for forming an image onto an imaging device, such as a CCD or CMOS, etc.

2. Description of the Prior Art

In recent years, high quality and fast zoom lens systems having a smaller F-number have been in demand, since further miniaturization of the pixels of imaging devices, such as CCDs and CMOSs, etc., and higher sensitivity of CCDs, have been attained. However, in reality, relatively slow zoom lens systems having an F-number of approximately 2.8 through 3.5 at the short focal length extremity are predominant.

Examples of the above-mentioned conventional zoom lens systems are taught in, e.g., Japanese Unexamined Patent Publication (hereinafter, JUPP) Nos. 2001-318311, 2003-015035, 2005-70696, 2005-70697, Japanese Patent Nos. 3652179 and 3709148, and JUPP No. 2006-126418.

Usually when an F-number becomes smaller, the correcting of spherical aberration and other aberrations becomes extremely difficult. Hence, in order to correct aberrations, the number of lens elements is significantly increased, and the number of lens groups are increased. Consequently, further miniaturization of the zoom lens system substantially becomes impossible.

SUMMARY OF THE INVENTION

The present invention is to provide a zoom lens system of three lens groups i.e., a first lens group having a negative refractive power (hereinafter, a negative first lens group), a second lens group having a positive refractive power (hereinafter, a positive second lens group) and a third lens group having a positive refractive power (hereinafter, a positive third lens group)) with the following features:

the F-number at the short focal length extremity is small enough by suitably determining the arrangement of lens elements in each lens group;

the entire zoom lens system is miniaturized;

higher optical quality which can cope with higher pixelization is attained.

According to an aspect of the present invention, there is provided a zoom lens system including a negative first lens group, a positive second lens group, and a positive third lens group, in this order from the object.

Each of the negative first lens group, the positive second lens group and the positive third lens group is moved along the optical axis to perform zooming.

The negative first lens group includes a negative lens element, a negative lens element and a positive lens element, in this order from the object.

The positive second lens group includes a positive lens element, a positive lens element and a negative lens element, in this order from the object. A combined refractive power of the image-side positive lens element and the negative lens element is negative, and these lens elements are cemented to each other.

The positive third lens group includes a positive lens element and a negative lens element which are cemented to each other, in this order from the object.

The zoom lens system satisfies the following condition:

$$1.2 \leq f_{2G}/f_{21} < 2.0 \tag{1}$$

wherein $f_{2G}$ designates a focal length of the positive second lens group; and $f_{21}$ designates a focal length of the most object-side positive lens element in the positive second lens group.

The zoom lens system preferably satisfies the following condition:

$$-1 < (R_{21O}+R_{21I})/(R_{21O}-R_{21I}) < -0.5 \tag{2}$$

wherein $R_{21O}$ designates a paraxial radius of curvature of the object-side surface of the most object-side positive lens element in the positive second lens group; and $R_{21I}$ designates a paraxial radius of curvature of the image-side surface of the most object-side positive lens element in the positive second lens group.

The zoom lens system preferably satisfies the following condition:

$$1 < |f_{22-23}|/f_{21} < 2 \tag{3}$$

wherein $f_{22-23}$ (<0) designates a combined focal length of the cemented lens elements (the image-side positive lens element and the negative lens element) in the positive second lens group; and $f_{21}$ designates the focal length of the most object-side positive lens element in the positive second lens group.

The zoom lens system preferably satisfies the following condition:

$$1.65 < n_{d21} \tag{4}$$

wherein $n_{d21}$ designates a refractive index of the d-line of the most object-side positive lens element in the positive second lens group.

The zoom lens system preferably satisfies the following condition:

$$1.8 < n_{1GA.V.} \tag{5}$$

wherein $n_{1GA.V.}$ designates an average value of refractive indexes of the lens elements which constitute the negative first lens group.

The zoom lens system preferably satisfies the following condition:

$$5 < fc/f_{3G} < 50 \tag{6}$$

wherein fc is defined as $r_c/|n_{dp}-n_{dn}|$;

$r_c$ designates a radius of curvature of the bonding surface of the cemented lens elements in the third lens group;

$n_{dp}$ designates a refractive index of the d-line of the positive lens element in the positive third lens group;

$n_{dn}$ designates a refractive index of the d-line of the negative lens element in the positive third lens group; and $f_{3G}$ designates a focal length of the positive third lens group.

The zoom lens system preferably satisfies the following condition:

$$20 < v_{dp}-v_{dn} \tag{7}$$

wherein $v_{dp}$ designates an Abbe number of the positive lens element in the positive third lens group; and $v_{dn}$ designates an Abbe number of the negative lens element in the positive third lens group.

The present disclosure relates to subject matter contained in Japanese Patent Application No. 2007-142992 (filed on May 30, 2007) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system, at the short focal length extremity, according to a first embodiment of the present invention;

FIGS. 2A, 2B, 2C and 2D show aberrations occurred, at the short focal length extremity, in the lens arrangement shown in FIG. 1;

FIG. 5 is a lens arrangement of the zoom lens system, at the short focal length extremity, according to a second embodiment of the present invention;

FIGS. 6A, 6B, 6C and 6D show aberrations occurred, at the short focal length extremity, in the lens arrangement shown in FIG. 5;

FIG. 9 is a lens arrangement of the zoom lens system, at the short focal length extremity, according to a third embodiment of the present invention;

FIGS. 10A, 10B, 10C and 10D show aberrations occurred, at the short focal length extremity, in the lens arrangement shown in FIG. 9;

DESCRIPTION OF THE PREFERRED EMBODIMENTS

Figure 3A:
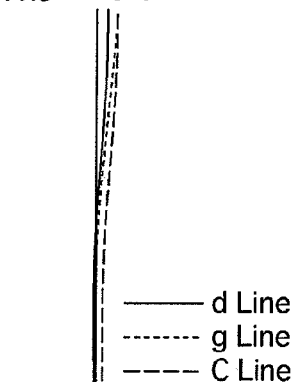
FIGS. 3A, 3B, 3C and 3D show aberrations occurred, at an intermediate focal length, in the lens arrangement shown in FIG. 1.
Figure 3B:
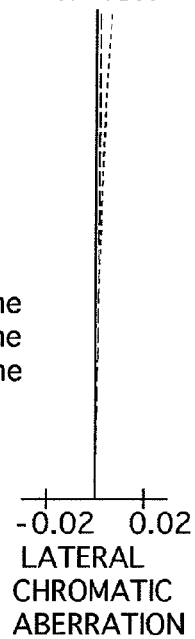
Figure 3C:
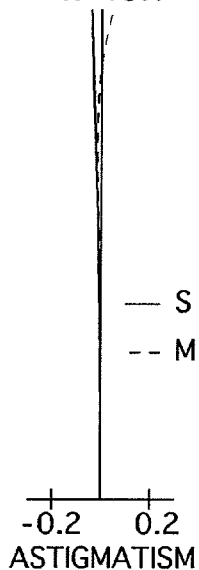
Figure 3D:
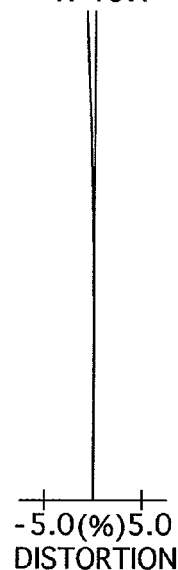
Figure 4A:
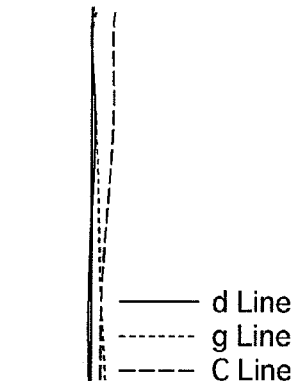
FIGS. 4A, 4B, 4C and 4D show aberrations occurred, at the long focal length extremity, in the lens arrangement shown in FIG. 1.
Figure 4B:
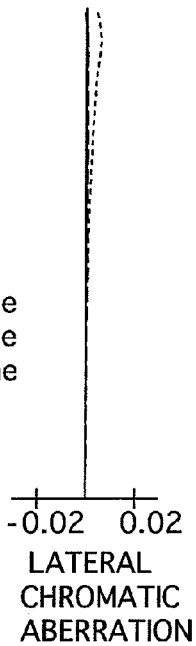
Figure 4C:
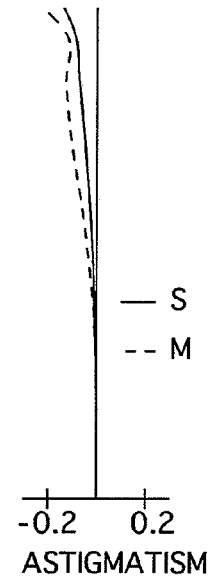
Figure 4D:
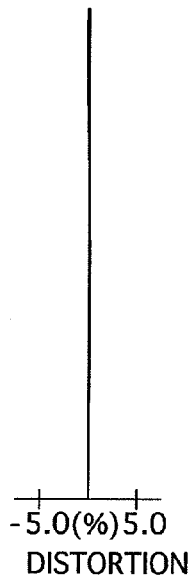
Figure 7A:
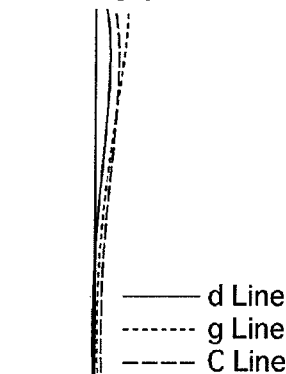
FIGS. 7A, 7B, 7C and 7D show aberrations occurred, at an intermediate focal length, in the lens arrangement shown in FIG. 5.
Figure 7B:
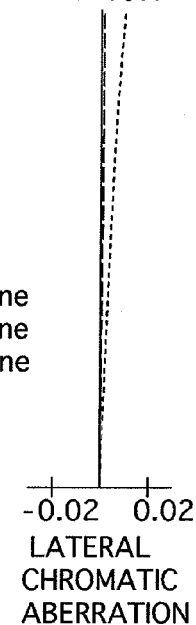
Figure 7C:
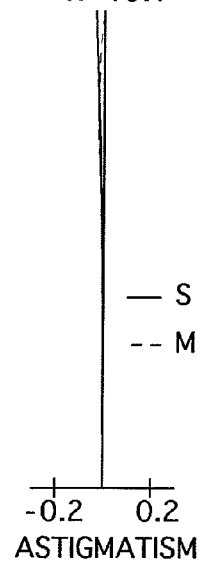
Figure 7D:
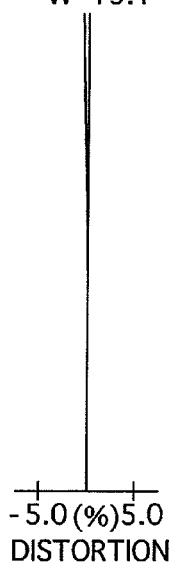
Figure 8A:
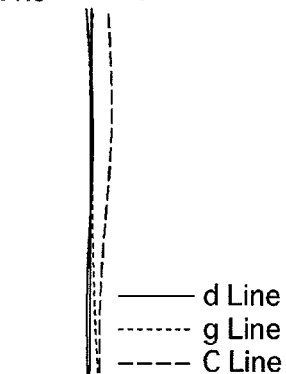
FIGS. 8A, 8B, 8C and 8D show aberrations occurred, at the long focal length extremity, in the lens arrangement shown in FIG. 5.
Figure 8B:
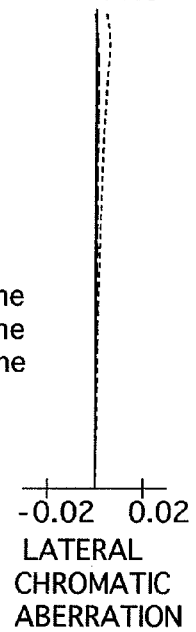
Figure 8C:
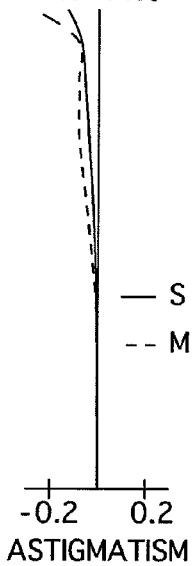
Figure 8D:
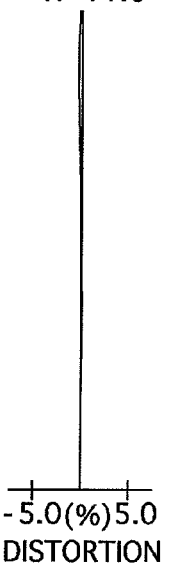
Figure 11A:
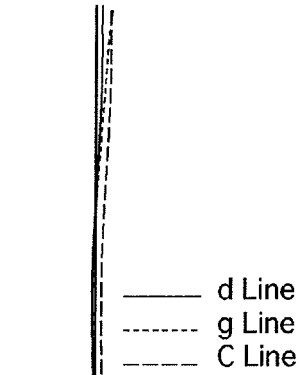
FIGS. 11A, 11B, 11C and 11D show aberrations occurred, at an intermediate focal length, in the lens arrangement shown in FIG. 9.
Figure 11B:
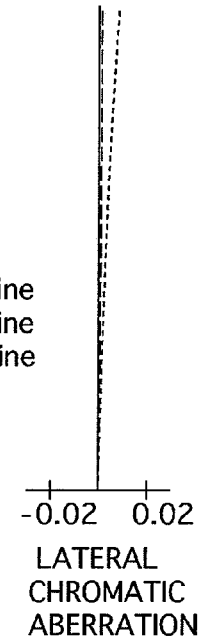
Figure 11C:
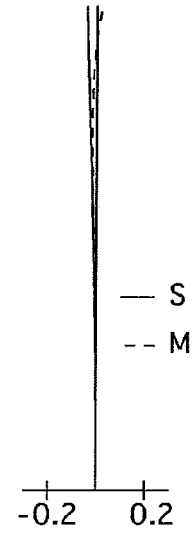
Figure 11D:
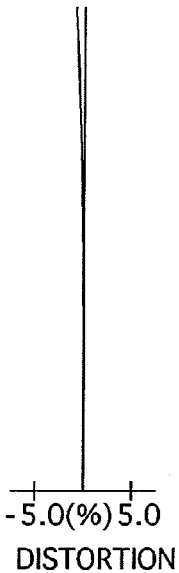
Figure 12A:
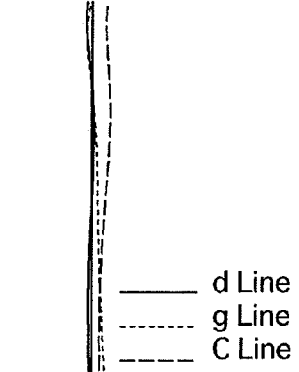
FIGS. 12A, 12B, 12C, and 12D show aberrations occurred, at the long focal length extremity, in the lens arrangement shown in FIG. 9.
Figure 12B:
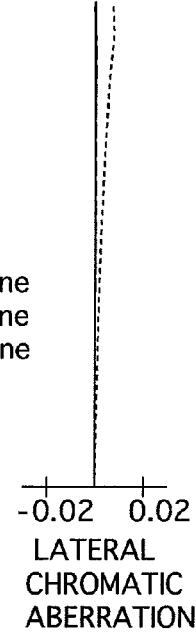
Figure 12C:
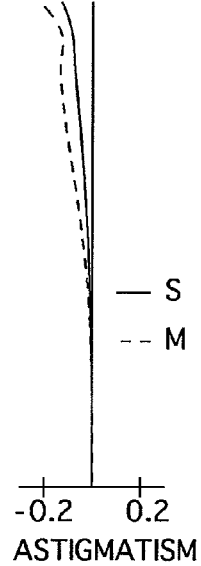
Figure 12D:
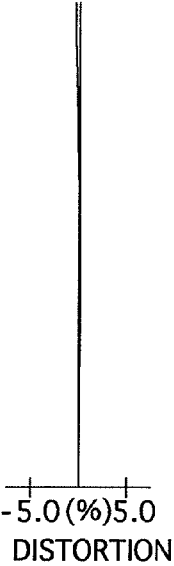
Figure 13:
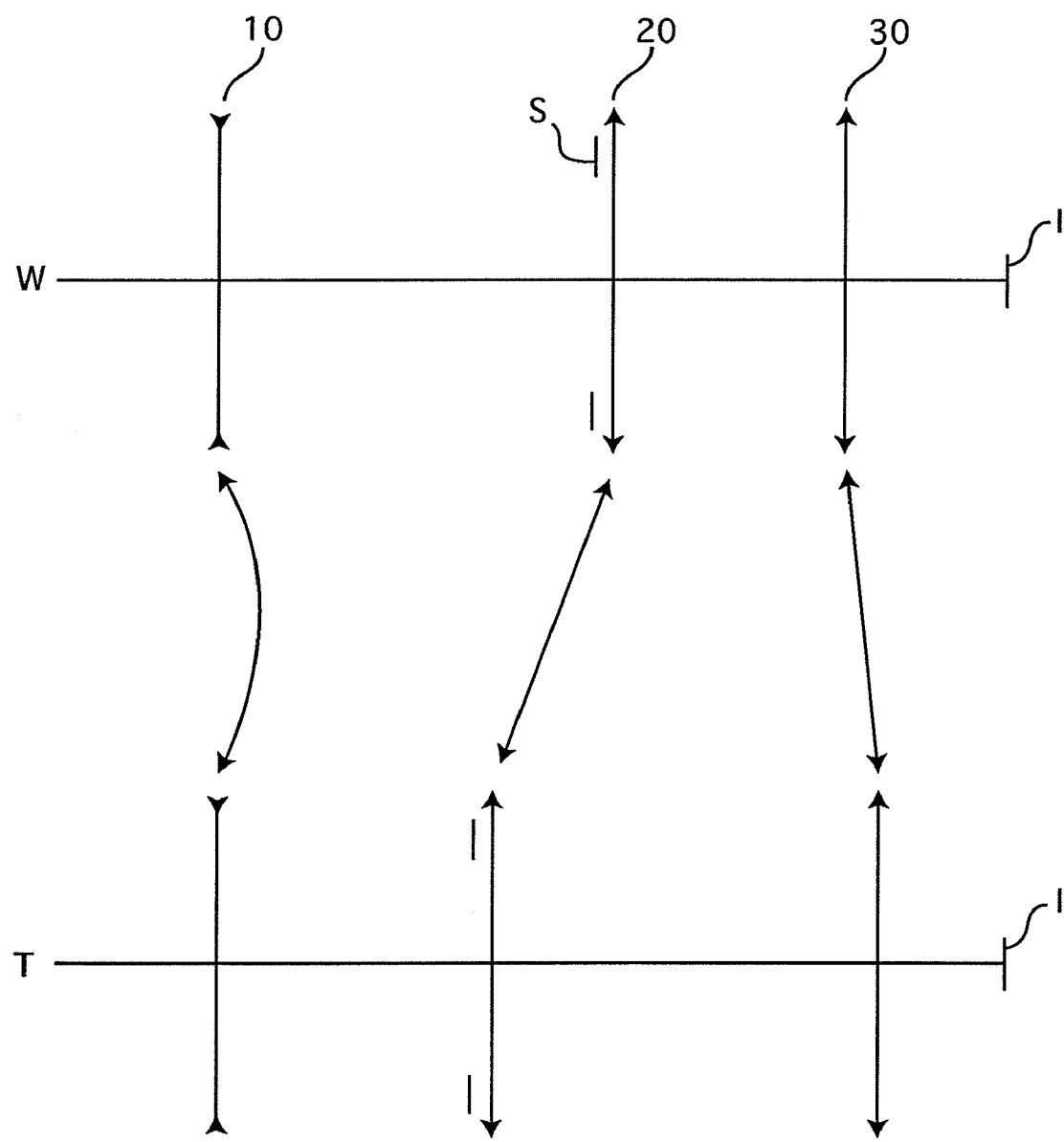
FIG. 13 is the schematic view of the lens-group moving paths for the zoom lens system according to the present invention.

A zoom lens system as an embodiment of the present invention, as shown in the zoom path of FIG. 13, includes a negative first lens group 10, a diaphragm S, a positive second lens group 20, and a positive third lens group 30, in this order from the object.

Upon zooming from the short focal length extremity (W) to the long focal length extremity (T), the negative first lens group 10 first moves toward the image and thereafter moves toward the object, the positive second lens group 20 moves monotonically toward the object, and the positive third lens group 30 moves monotonically toward the image; the distance between the negative first lens group 10 and the positive second lens group 20 decreases, and the distance between the positive second lens group 20 and the positive third lens group 30 increases.

'I' designates an imaging plane; and in a digital camera a filter group is provided immediately in front of this imaging plane I.

The diaphragm S moves together with the positive second lens group 20 upon zooming.

Focusing is carried out by the positive third lens group 30.

It is possible to alternatively provide the diaphragm S between the positive second lens group 20 and the positive third lens group 30.

As shown in each of the first through third embodiments shown in FIGS. 1, 5 and 9, the negative first lens group 10 includes a negative lens element 11, a negative lens element 12, and a positive lens element 13, in this order from the object.

The positive second lens group 20 includes a positive lens element 21, a positive lens element 22, and a negative lens element 23, in this order from the object. The positive lens element 22 and the negative lens element 23 are bonded to each other.

The positive third lens group 30 includes a positive lens element 31 and a negative lens element 32 which are cemented to each other, in this order from the object.

'CG' designates a cover glass which is provided in front of an imaging device.

In conventional zoom lens systems having an F-number of approximately 2.8 through 3.5 at the short focal length extremity, the correcting of spherical aberration and distortion can be done by collecting axial light rays through the first lens group even when the first lens group is constituted by two lens elements, i.e., a negative lens element and a positive lens element.

However, the diameter of a bundle of axial light rays collected by the first lens group becomes larger, accompanying the setting of a smaller F-number which is one of the objective of the present invention. Accordingly, if an attempt is made to sharply bend light rays by one negative lens element, spherical aberration in particular inevitably occurs. Furthermore, by forming this negative lens element to have the divergent component, negative distortion which occurs at the short focal length extremity also becomes larger.

Even if the distance between the negative lens element and the positive lens element is made longer, the distance sensitivity of the spherical aberration becomes undesirably higher.

Accordingly, in the present invention, the negative first lens group 10 is constituted by three lens elements, i.e., a negative lens element, a negative lens element, and a positive lens element, in this order from the object, so that the negative refractive power is distributed over the two lens elements. Consequently, a bundle of axial light rays is collected; and the correcting of spherical aberration is done, and the correcting of distortion becomes possible.

In regard to the positive second lens group 20, normally a large amount of spherical aberration occurs in the most object-side positive lens element.

In the case of a conventional zoom lens system having an F-number in the range of approximately 2.8 through 3.5, the second lens group is a triplet lens arrangement, i.e., having either a positive lens element, another positive lens element, and a negative lens element, in this order from the object, or a positive lens element, a negative lens element, and a positive lens element, in this order from the object, the correcting of spherical aberration in particular can be preformed.

However, the correcting of aberrations becomes difficult, accompanying the setting of a smaller F-number which is one of the objective of the present invention. Then, in the present invention, by adequately determining both the refractive power of the entire positive second lens group 20 and that of the most object-side lens element of the positive second lens group 20, the correcting of spherical aberration in particular becomes possible.

In the case where the most object-side lens group is a focusing lens group, the diameter of the focusing lens group becomes larger in order to avoid a decrease of peripheral illumination upon focusing. Moreover, the mechanical structure thereof becomes more complicated and larger. Therefore it is generally advantageous to employ the third lens group 30 as a focusing lens group.

In a fast zoom lens system having a smaller F-number, for the purpose of reducing fluctuations of aberrations (especially field curvature and lateral chromatic aberration)when focusing is performed, it is generally advantageous for the third lens group to be constituted by a positive lens element and a negative lens element which are cemented to each other, rather than one positive lens element, from the viewpoint of the correcting of aberrations.

Condition (1) specifies the ratio of the entire focal length of the positive second lens group 20 to the focal length of the most object-side positive lens element in the positive second lens group 20.

By appropriately distributing the refractive power over the positive second lens group 20 so that condition (1) is satisfied, it becomes possible to suitably correct aberrations.

If the refractive power of the most object-side positive lens element in the positive second lens group 20 becomes stronger to the extent that $f_{2G}/f_{21}$ exceeds the upper limit of condition (1), spherical aberration in particular is undercorrected, and the correcting thereof cannot be performed. In the case where an increase of the aperture is considered, it is necessary to suitably correct spherical aberration.

If the overall refractive power of the positive second lens group 20 becomes stronger to the extent that $f_{2G}/f_{21}$ exceeds the lower limit of condition (1), the correcting of aberrations in the positive second lens group 20 with the three lens elements becomes difficult; and fluctuations of aberration, especially fluctuations of coma, upon zooming from the short focal length extremity to the long focal length extremity, cannot be corrected.

In a larger-aperture zoom lens system having a smaller F-number, which is one of the objective of the present invention, spherical aberration largely occurs in the most object-side positive lens element in the positive second lens group 20.

Condition (2) specifies the shaping factor to be satisfied by the most object-side positive lens element in the positive second lens group 20 in order to reduce spherical aberration.

If $(R_{21O}+R_{21I})/(R_{21O}-R_{21I})$ exceeds either the upper or lower limits of condition (2), spherical aberration which occurs in the positive second lens group 20 cannot be corrected sufficiently.

Condition (3) specifies the ratio of the combined focal length (a negative refractive power) of the image-side positive lens element and the negative lens element in the positive second lens group 20 to the focal length of the most object-side positive lens element in the positive second lens group 20.

If the negative refractive power of the cemented lens elements becomes weaker to the extent that $|f_{22-23}|/f_{21}$ exceeds the upper limit of condition (3), the negative divergent component of the positive second lens group 20 which corrects aberrations occurred in the positive second lens group 20 becomes weaker. Consequently, spherical aberration is undercorrected.

If the negative refractive power of the cemented lens elements becomes stronger to the extent that $|f_{22-23}|/f_{21}$ exceeds the lower limit of condition (3), the negative divergent component of the positive second lens group 20 becomes too strong. Consequently, spherical aberration is overcorrected.

Condition (4) specifies the refractive index of the d-line of the most object-side positive lens element in the positive second lens group 20.

In the case of the correcting of spherical aberration occurred in a large-aperture lens system, if a glass material having a lower refractive index is employed to the extent that $n_{d21}$ exceeds the lower limit of condition (4), the radius of curvature of the most object-side positive lens element in the positive second lens group 20 becomes too small. As a result, spherical aberration, in particular, cannot be corrected.

Condition (5) specifies the average value of the refractive indexes of the lens elements constituting the negative first lens group 10.

If the refractive indexes of the glass materials of the negative first lens group 10 are lower to the extent that $n_{1GA.V}$ exceeds the lower limit of condition (5), distortion, in particular, cannot be corrected.

Condition (6) relates to the positive third lens group 30 that is constituted by a positive lens element and a negative lens element cemented to each other, in this order from the object.

If the radius of curvature of the bonding surface of the cemented lens elements becomes larger to the extent that $fc/f_{3G}$ exceeds the upper limit of condition (6), axial chromatic aberration and lateral chromatic aberration are undercorrected, especially at the short focal length extremity.

If the radius of curvature of the bonding surface of the cemented lens elements becomes smaller to the extent that $fc/f_3G$ exceeds the lower limit of condition (6), axial chromatic aberration and lateral chromatic aberration are overcorrected.

Condition (7) specifies the Abbe number of the positive third lens group 30 that is constituted by the positive lens element 31 and the negative lens element 32 cemented to each other.

If the difference in the Abbe number between the positive lens element and the negative lens element of the positive third lens group 30 becomes smaller to the extent that $v_{dp}-v_{dn}$ exceeds the lower limit of condition (7), fluctuations of aberrations (especially lateral chromatic aberration) when focusing is performed, particularly on the side of the long focal length extremity.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNo. designates the F-number, f designates the focal length of the entire zoom lens system, W designates the half angle-of-view (°), fB designates the back focal distance, r designates the radius of curvature, d designates the lens-element thickness or a distance between lens elements (lens groups), $N_d$ designates the refractive index of the d-line, and v designates the Abbe number. The values for the distance "d", the F-number "FNO", the focal length "f", the half angle-of-view "W" and the back focal distance "fB" are indicated in the order of the short focal length extremity, an intermediate focal length and the long focal length extremity.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the zoom lens system, at the short focal length extremity, according to the first embodiment of the present invention. FIGS. 2A through 2D show aberrations occurred, at the short focal length extremity, in the lens arrangement shown in FIG. 1. FIGS. 3A through 3D show aberrations occurred, at an intermediate focal length, in the lens arrangement shown in FIG. 1. FIGS. 4A through 4D show aberrations occurred, at the long focal length extremity, in the lens arrangement shown in FIG. 1.

Table 1 shows the numerical data of the first embodiment.

The negative first lens group 10 (surface Nos. 1 through 6) includes the negative lens element 11, the negative lens element 12, and the positive lens element 13, in this order from the object.

The positive second lens group 20 (surface Nos. 7 through 11) includes a positive lens element 21, a positive lens element 22, and a negative lens element 23, in this order from the object. The positive lens element 22 on the image side and the negative lens element 23 are cemented to each other to constitute the cemented lens elements.

The positive third lens group 30 (surface Nos. 12 through 14) is constituted by the positive lens element 31 and the negative lens element 32 to be cemented to each other, in this order from the object.

'CG' designates a cover glass (surface Nos. 15 and 16).

The diaphragm S is provided 0.90 in front of (on the object side) the positive second lens group 20 (surface No. 7).

Aspherical surface data (the aspherical surface coefficients not indicated are zero (0.00)):

| Surf. No. | K | A4 | A6 | A8 |
|---|---|---|---|---|
| 2 | 0.00 | $-0.83454 \times 10^{-4}$ | $0.73222 \times 10^{-6}$ | $-0.41250 \times 10^{-7}$ |
| 5 | 0.00 | $-0.56445 \times 10^{-4}$ | $-0.89245 \times 10^{-6}$ | $-0.64189 \times 10^{-8}$ |
| 6 | 0.00 | $-0.31664 \times 10^{-4}$ | $-0.15332 \times 10^{-5}$ | $0.12128 \times 10^{-7}$ |
| 7 | 0.00 | $-0.22882 \times 10^{-3}$ | $-0.28265 \times 10^{-5}$ | $0.61911 \times 10^{-8}$ |
| 8 | 0.00 | $0.13747 \times 10^{-3}$ | $-0.95852 \times 10^{-6}$ | $-0.57596 \times 10^{-7}$ |
| 12 | 0.00 | $-0.42178 \times 10^{-4}$ | $0.30208 \times 10^{-5}$ | $-0.84081 \times 10^{-7}$ |

Embodiment 2

FIG. 5 is the lens arrangement of the zoom lens system, at the short focal length extremity, according to the second embodiment of the present invention. FIGS. 6A through 6D show aberrations occurred, at the short focal length extremity, in the lens arrangement shown in FIG. 5. FIGS. 7A through 7D show aberrations occurred, at an intermediate focal length, in the lens arrangement shown in FIG. 5. FIGS. 8A through 8D show aberrations occurred, at the long focal length extremity, in the lens arrangement shown in FIG. 5.

Table 2 shows the numerical data of the second embodiment.

The basic lens arrangement of the second embodiment is the same as that of the first embodiment.

The diaphragm S is provided 0.90 in front of (on the object side) the positive second lens group 20 (surface No. 7).

TABLE 1

$F_{NO.}$ = 1:2.0-3.0-4.2
f = 8.00-13.50-23.40 (Zoom Ratio = 2.93)
W = 31.3-19.1-11.6
fB = 2.00-2.00-2.00

| Surf. No. | r | d | Nd | ν |
|---|---|---|---|---|
| 1 | 31.965 | 0.80 | 1.88300 | 40.8 |
| 2* | 9.071 | 3.00 | — | — |
| 3 | −30.267 | 0.70 | 1.78931 | 37.6 |
| 4 | 119.300 | 1.20 | — | — |
| 5* | 21.610 | 2.00 | 1.84666 | 23.8 |
| 6* | −411.063 | 17.90-8.55-1.91 | — | — |
| 7* | 8.409 | 3.20 | 1.69350 | 53.2 |
| 8* | −33.905 | 0.20 | — | — |
| 9 | 19.041 | 2.60 | 1.88300 | 40.8 |
| 10 | −11.819 | 0.70 | 1.70435 | 28.7 |
| 11 | 4.968 | 8.25-15.19-25.58 | — | — |
| 12* | 22.000 | 3.20 | 1.69350 | 53.2 |
| 13 | −11.000 | 0.80 | 1.67270 | 31.3 |
| 14 | −32.370 | 1.70-0.81-0.57 | — | — |
| 15 | ∞ | 1.00 | 1.51633 | 64.1 |
| 16 | ∞ | — | — | — |

The symbol * designates the aspherical surface which is rotationally symmetrical with respect to the optical axis.

TABLE 2

$F_{NO.}$ = 1:2.0-3.0-4.3
f = 8.00-13.49-23.39 (Zoom Ratio = 2.92)
W = 30.8-19.1-11.6
fB = 1.90-1.89-1.89

| Surf. No. | r | d | Nd | ν |
|---|---|---|---|---|
| 1 | 34.523 | 0.75 | 1.88300 | 40.8 |
| 2* | 8.797 | 3.01 | — | — |
| 3 | −33.380 | 0.75 | 1.73468 | 36.8 |
| 4 | 151.705 | 1.22 | — | — |
| 5* | 21.891 | 2.06 | 1.84666 | 23.8 |
| 6* | −275.833 | 19.78-12.08-3.98 | — | — |
| 7* | 8.360 | 3.65 | 1.70662 | 53.3 |
| 8* | −34.391 | 0.20 | — | — |
| 9 | 21.999 | 2.32 | 1.88300 | 40.8 |
| 10 | −12.079 | 0.65 | 1.72551 | 29.2 |
| 11 | 5.137 | 7.96-17.23-27.90 | — | — |
| 12* | 22.000 | 3.25 | 1.69680 | 55.5 |
| 13 | −11.500 | 0.75 | 1.62951 | 34.4 |
| 14 | −35.585 | 2.99-0.58-0.49 | — | — |
| 15 | ∞ | 1.00 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | $-0.98552 \times 10^{-4}$ | $0.12916 \times 10^{-6}$ | $-0.46221 \times 10^{-7}$ |
| 5 | 0.00 | $-0.50448 \times 10^{-4}$ | $-0.85519 \times 10^{-6}$ | $-0.11457 \times 10^{-7}$ |
| 6 | 0.00 | $-0.32997 \times 10^{-4}$ | $-0.15589 \times 10^{-5}$ | $0.15203 \times 10^{-7}$ |
| 7 | 0.00 | $-0.21061 \times 10^{-3}$ | $-0.27562 \times 10^{-5}$ | $0.28270 \times 10^{-8}$ |
| 8 | 0.00 | $0.13454 \times 10^{-3}$ | $-0.11646 \times 10^{-5}$ | $-0.64425 \times 10^{-7}$ |
| 12 | 0.00 | $-0.36769 \times 10^{-4}$ | $0.27113 \times 10^{-5}$ | $-0.83081 \times 10^{-7}$ |

Embodiment 3

FIG. 9 is the lens arrangement of the zoom lens system, at the short focal length extremity, according to the third embodiment of the present invention. FIGS. 10A through 10D show aberrations occurred, at the short focal length extremity, in the lens arrangement shown in FIG. 9. FIGS. 11A through 11D show aberrations occurred, at an intermediate focal length, in the lens arrangement shown in FIG. 9. FIGS. 12A through 12D show aberrations occurred, at the long focal length extremity, in the lens arrangement shown in FIG. 9.

Table 3 shows the numerical data of the third embodiment.

The basic lens arrangement of the third embodiment is the same as that of the first embodiment.

The diaphragm S is provided 0.90 in front of (on the object side) the positive second lens group 20 (surface No. 7).

TABLE 3

$F_{NO.}$ = 1:2.0-3.0-4.2
f = 8.00-13.50-23.39 (Zoom Ratio = 2.92)
W = 31.3-19.1-11.6
fB = 2.00-2.00-2.00

| Surf. No. | r | d | Nd | ν |
|---|---|---|---|---|
| 1 | 30.217 | 0.80 | 1.88300 | 40.8 |
| 2* | 9.019 | 3.13 | — | — |
| 3 | −30.123 | 0.70 | 1.78032 | 40.6 |
| 4 | 121.555 | 0.99 | — | — |
| 5* | 21.509 | 2.08 | 1.84666 | 23.8 |
| 6* | −989.792 | 17.64-8.52-1.90 | — | — |
| 7* | 8.548 | 3.19 | 1.67988 | 55.1 |
| 8* | −33.463 | 0.20 | — | — |
| 9 | 17.549 | 2.77 | 1.88300 | 40.8 |
| 10 | −11.367 | 0.70 | 1.69987 | 29.0 |
| 11 | 4.910 | 7.61-14.41-24.39 | — | — |
| 12* | 28.149 | 3.20 | 1.69350 | 53.2 |
| 13 | −12.116 | 0.80 | 1.74752 | 27.8 |
| 14 | −23.519 | 1.92-0.92-0.81 | — | — |
| 15 | ∞ | 1.00 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | $-0.71077 \times 10^{-4}$ | $0.90188 \times 10^{-6}$ | $-0.53543 \times 10^{-7}$ |
| 5 | 0.00 | $-0.57470 \times 10^{-4}$ | $-0.94945 \times 10^{-6}$ | $-0.46518 \times 10^{-8}$ |
| 6 | 0.00 | $-0.39144 \times 10^{-4}$ | $-0.15164 \times 10^{-5}$ | $0.12228 \times 10^{-7}$ |
| 7 | 0.00 | $-0.23036 \times 10^{-3}$ | $-0.28088 \times 10^{-5}$ | $0.11864 \times 10^{-7}$ |
| 8 | 0.00 | $0.13362 \times 10^{-3}$ | $-0.90504 \times 10^{-6}$ | $-0.52579 \times 10^{-7}$ |
| 12 | 0.00 | $-0.44916 \times 10^{-4}$ | $0.30239 \times 10^{-5}$ | $-0.84661 \times 10^{-7}$ |

The numerical values of each condition for each embodiment are shown in Table 4.

TABLE 4

| | Embod. 1 | Embod. 2 | Embod. 3 |
|---|---|---|---|
| Condition (1) | 1.51 | 1.70 | 1.42 |
| Condition (2) | −0.60 | −0.61 | −0.59 |
| Condition (3) | 1.45 | 1.28 | 1.54 |
| Condition (4) | 1.69 | 1.71 | 1.68 |
| Condition (5) | 1.84 | 1.82 | 1.84 |
| Condition (6) | 27.8 | 9.1 | 11.3 |
| Condition (7) | 21.9 | 21.2 | 25.5 |

As can be understood from Table 4, the first through third embodiments satisfy conditions (1) through (7). Furthermore, as can be understood from the aberration diagrams, the various aberrations are suitably corrected.

According to the present invention, a zoom lens system of three lens groups (i.e., a negative first lens group, a positive second lens group and a positive third lens group, in this order from the object) with the following features can be attained:

the F-number at the short focal length extremity is small enough, for example, approximately 2, by suitably determining the arrangement of lens elements in each lens group;

the entire zoom lens system is miniaturized; higher optical quality which can cope with high pixelization is attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group, and a positive third lens group, in this order from the object, wherein each of said negative first lens group, said positive second lens group and said positive third lens group is moved along the optical axis to perform zooming;

wherein said negative first lens group comprises a negative lens element, a negative lens element and a positive lens element, in this order from the object;

wherein said positive second lens group comprises a positive lens element, a positive lens element and a negative lens element, in this order from the object, a combined refractive power of said image-side positive lens element and said negative lens element is negative, and said image-side positive lens element and said negative lens element are cemented to each other;

wherein said positive third lens group comprises a positive lens element and a negative lens element which are cemented to each other, in this order from the object; and wherein said zoom lens system satisfies the following condition:

$$1.2 < f_{2G}/f_{21} < 2.0$$

wherein f$_{2G}$ designates a focal length of said positive second lens group; and f$_{21}$ designates a focal length of the most object-side positive lens element in said positive second lens group.

2. The zoom lens system according to claim 1, satisfying the following condition:

$$-1<(R_{21O}+R_{21I})/(R_{21O}-R_{21I})<-0.5$$

wherein

R$_{21O}$ designates a paraxial radius of curvature of the object-side surface of the most object-side positive lens element in said positive second lens group; and R$_{21I}$ designates a paraxial radius of curvature of the image-side surface on the image side of the most object-side positive lens element in said positive second lens group.

3. The zoom lens system according to claim 1, satisfying the following condition:

$$1<|f_{22-23}|/f_{21}<2 \quad (3)$$

wherein f$_{22-23}$ (<0) designates a combined focal length of said cemented lens elements in said positive second lens group; and f$_{21}$ designates the focal length of the most object-side positive lens element in said positive second lens group.

4. The zoom lens system according to claim 1, satisfying the following condition:

$$1.65<n_{d21}$$

wherein n$_{d21}$ designates a refractive index of the d-line of the most object-side positive lens element in said positive second lens group.

5. The zoom lens system according to claim 1, satisfying the following condition:

$$1.8<n_{1GA.V.}$$

wherein n$_{1GA.V.}$ designates an average value of refractive indexes of said lens elements which are comprised in said negative first lens group.

6. The zoom lens system according to claim 1, satisfying the following condition:

$$5<fc/f_{3G}<50$$

wherein fc is defined as $r_c/|n_{dp}-n_{dn}|$;

r$_c$ designates a radius of curvature of the bonding surface of said cemented lens elements in said third lens group;

n$_{dp}$ designates a refractive index of the d-line of said positive lens element in said positive third lens group;

n$_{dn}$ designates a refractive index of the d-line of said negative lens element in said positive third lens group; and f$_{3G}$ designates a focal length of said positive third lens group.

7. The zoom lens system according to claim 1, satisfying the following condition:

$$20<\nu_{dp}-\nu_{dn} \quad (7)$$

wherein $\nu_{dp}$ designates an Abbe number of said positive lens element in said positive third lens group; and $\nu_{dn}$ designates an Abbe number of said negative lens element in said positive third lens group.

* * * * *